United States Patent Office 3,023,189
Patented Feb. 27, 1962

3,023,189
TRIFLUOROCHLOROETHYLENE POLYMER-EPOXY RESIN MIXTURE
Julius A. Jupa, Elizabeth, N.J., assignor, by mesne assignments, to Minnesota Mining and Manufacturing Company, St. Paul, Minn., a corporation of Delaware
No Drawing. Filed Dec. 30, 1954, Ser. No. 478,897
1 Claim. (Cl. 260—45.5)

This invention relates to resinous compositions comprising mixtures of perfluorochloroolefin polymers with epoxide condensation products.

The perfluorochloroolefin polymers, such as polymers of trifluorochloroethylene, have a unique combination of physical and chemical characteristics which has led to their use in a variety of applications. Physically, these polymers possess high thermal stability and excellent electrical properties and are therefore widely used as electrical insulation where high temperatures are encountered. Chemically, these polymers offer excellent resistance to highly corrosive chemicals, solvents, etc. and are, therefore, widely used as protection media. However, in some instances, it is desirable to modify the characteristics of these polymers so as to increase adhesiveness and hardness and thereby extend the range of utility of the polymer.

The epoxide resins are widely employed as coatings for wire, and metal surfaces generally. These resins, however, do not offer the chemical resistance which is found in the perfluorochloroolefin polymers. Additionally, the physical properties of the epoxide resins are not entirely satisfactory, since they are relatively hard and brittle and are therefore not susceptible to use in conditions where high impact strength is important. Modification of these resins so as to improve their chemical resistance and impact strength is therefore desirable.

It is an object of this invention to provide compositions which have a combination of good physical characteristics with a high degree of chemical resistance.

It is another object of this invention to provide additives which improve the chemical resistance of the epoxide resins.

It is another object of this invention to provide additives which improve the physical characteristics of the perfluorochloroolefin polymers.

It is another object of this invention to provide compositions which are useful in the application of perfluorochloroolefin polymer coatings.

It is another object of this invention to provide a protective coating for metal surfaces.

It is another object of this invention to provide perfluorochloroolefin polymer coating compositions.

It is another object of this invention to provide perfluorochloroolefin polymer compositions which can be fabricated into useful end items by casting and slush molding techniques.

Various other objects and advantages of the present invention will become apparent to those skilled in the art from the accompanying description and disclosure.

Generally, the above objects are accomplished by use of the compositions of this invention which comprise mixtures of the perfluorochloroolefin polymers with epoxide resins which mixtures are converted into infusible homogeneous products by heating preferably in the presence of an amine curing agent.

The perfluorochloroolefin polymers to which this invention is applicable are prepared by homopolymerization of monomers, such as trifluorochloroethylene, difluorodichloroethylene, etc. and the copolymerization of the above described perfluorochloroolefins with other halogenated olefins, such as vinylidene fluoride, vinyl fluoride, vinylidene chloride and vinyl chloride. These polymers, i.e., homopolymers and copolymers are to be distinguished from low molecular weight polymers of the same monomers which exist in the oil, grease and wax range. Thus, these polymers are normally solid, have softening points above about 200° C. and in the case of homopolymers of trifluorochloroethylene, have no-strength temperature (N.S.T.) of at least 220° C. and preferably above about 250° C. The term polymer includes homopolymers and copolymers.

The epoxide resins which are used for the composition of this invention, are prepared by the condensation of epoxy compounds, such as epichlorohydrin and glycerol dichlorohydrin with polyhydric organic compounds in the presence of sodium hydroxide to split off HCl or NaCl. Among the polyhydric compounds which can be used, are alcohols, such as mannitol, sorbitol, erythritol, pentaerythritol and polyallyl alcohol; dihydric alcohols, trihydric alcohols such as glycerol or trimethylol propane; dihydric phenols, such as bisphenol, (p,p'-dihydroxy diphenyl dimethyl methane) and trihydric phenols. Because of their greater bond strength, higher chemical resistance, better physical properties and availability, epoxide resins prepared by the condensation of bisphenol and epichlorohydrin are preferred in the preparation of the composition of this invention. In their original form, the epoxide resins are relatively low molecular weight compounds ranging from liquids to rather high melting solids depending on the degree of condensation. Thus, these epoxide resins range in properties from light mobile liquids melting at about 0° C. and having a viscosity from C to F on the Gardner Holt scale, up to high melting solids having a melting point of about 160–170° C. and a viscosity as a 40 percent solution in butyl carbitol of about $Z_1$–$Z_5$ on the Gardner Holt scale. The degree of condensation of the epoxy resin can be defined by reference to the "epoxy value" which is defined as the equivalent of epoxy groups per 100 gms. of resin. The resins used in this invention should have an epoxy value between about 0.03 and about 0.65. The epoxy value of normally liquid resins ranges between about 0.3 and about 0.65, while normally solid resins ranges between about 0.03 and about 0.3. Another and more frequently used expression for indicating the degree of condensation of the resin is the "epoxy equivalent" which is defined as the weight of resin in gms. containing one gm. equivalent of epoxy groups. Here, the higher the equivalent the higher the degree of condensation of resin. Under this definition the resins of this invention should have an epoxy equivalent of at least 150 and should preferably not exceed about 3400. The epoxide resins are commercially available as Epon, Araldite and Exon.

As indicated previously, the epoxide resins are available as liquids or solids. In preparing the compositions of this invention, either liquid or solid epoxy resins can be employed, since on curing, very little difference is observed between compositions which are based on the liquid or the solid resins. Because of the ease of application, the use of liquid epoxide resins in the compositions of this invention, is preferred. When blended with the perfluorochloroolefin polymer, these liquid resins form slurries or pastes which are more easily handled. When the solid epoxide resins are employed, it is preferred that they be used in the form of solutions in suitable solvents, such as ketones, e.g., methyl ethyl ketone, acetone, etc.; esters, e.g., butyl carbitol, etc. The perfluorochloroolefin polymer is, of course, insoluble in these solvents, but is present in the form of a dispersion.

In preparing the compositions of this invention, between about 1 and about 99 weight percent, preferably between about 10 and about 90 weight percent of the perfluorochloroolefin polymer in finely divided form (i.e., at least 95% through a No. 7 sieve, preferably a No. 12 sieve in the U.S. Standard Series) is mixed with the epoxide resin. The exact proportions of perfluorochloroolefin polymer is based on the use for which the composition is intended. Where maximum chemical resistance is required, the perfluorochloroolefin polymer constitutes a major proportion of the composition, that is between about 50 and about 90 weight percent, whereas where maximum bond strength and hardness is required the epoxide resin constitutes the major proportion of the composition. By employing several compositions containing varying proportions of the ingredients, properties of the ultimate article can be controlled. Thus, in coating applications, several coats can be applied, for example to a metal surface in which the inner coating contains lesser quantities of the perfluorochloroolefin polymer and the outer coating contains higher quantities of the perfluorochloroolefin polymer. In this way, compositions having maximum bond strength and maximum chemical resistance are obtained. The epoxide resin, in admixture with the perfluorochloroolefin polymer, is converted from the relatively low molecular weight soluble compound to relatively high molecular weight insoluble compound by heating at elevated temperatures for prolonged periods of time, or preferably by the incorporation of a curing agent. Where a temperature-time cure is effected, the resin is heated at a minimum of about 40° C. for a period of time up to about 12 hours. At elevated temperatures the time necessary to effect the curing is substantially reduced. For example, if the resin is heated to approximately 300° C. the curing time is about 10 seconds. Thus, in a time-temperature curing operation the resin is cured by heating between about 40° C. and about 300° C. for a period of time between about 10 seconds and about 12 hours. Since fusion of the perfluorochloroolefin polymer occurs at temperatures above about 211° C., curing is preferably carried out above this temperature and preferably above 250° C. The addition of a curing agent to the mixture substantially reduces the curing time required and is preferred. Time required with a curing agent is between about 1 second and about 2 hours. Temperature is the same, and preferably above 211° C. Representative of the curing agents which are used, in concentrations between about 3 and about 12 weight percent based on the epoxide resin, are the di-isocyanates, for example, methylene bis-(4-phenyl)-isocyanate, dialdehydes, for example glyoxal, dimercaptans, amines, polyamines, etc. The amine type are the preferred curing agents since their use results in compositions having better physical and chemical properties. In connection with the use of amine curing agents, it is believed that they cross-link the perfluorochloroolefin polymer with the epoxide resin and that the superior properties of the composition are due to the cross-linking of the resins. Representative of the amine type curing agents, are diethylene triamine, dimethyl amino propylamine, benzyl dimethyl amine, piperidine, diethylamine, pyridine, dicyandiamide. Of these, diethylene triamine is preferred for use with the liquid epoxides, while dicyandiamide is preferred for use with the solid epoxide.

As indicated previously, the compositions of this invention are suitable for use as coating compositions for the coating of metal surfaces to provide protection against corrosive environments, for example, nitric acid. These compositions are additionally useful for casting and slush molding various objects for example, gaskets, plugs, mounting boards, etc.

In order to illustrate the process of this invention the following examples which are not to be construed as unnecessarily limiting are presented.

*Example I*

This example illustrates the preparation by a casting technique of a trifluorochloroethylene-epoxide resin blend to form a plug. Approximately 15 parts of Bakelite epoxy resin No. 18774 which is an epichlorohydrin-bisphenol condensation product having a melting point of about 9° C., was admixed with approximately 8 parts of a homopolymer of trifluorochloroethylene having an N.S.T. of about 270° C. Approximately 5 parts of Bakelite curing agent No. 18793 which is diethylene triamine was added to the above composition. The above composition was thoroughly mixed, placed in a highly polished aluminum foil container of the desired shape and allowed to stand at approximately 40° C. for about 16 hours. A hard plug having good chemical properties was obtained.

*Example II*

A cylinder was prepared using the composition and technique of Example I. One surface of the cylinder was sanded and was placed in contact with a sheet of a homopolymer of trifluorochloroethylene (N.S.T. about 270° C.). This assembly was heated to 250° C. under slight pressure for about 2 minutes. The cylinder was firmly bonded to the homopolymer sheet.

*Example III*

Approximately 50 parts of epichlorohydrin bisphenol condensation product having a melting point of about 9° C. is admixed with approximately 15 parts of a finely divided homopolymer of trifluorochloroethylene having an N.S.T. of about 270. Approximately 5 parts of diethylenetriamine is added. The above composition is thoroughly admixed and is then applied to the surface of a steel panel. The coated panel is then heated at a temperature of about 250° C. for approximately 30 minutes and is then allowed to cool. A firmly bonded protective coating on the inside of the tank wall is obtained.

*Example IV*

This example illustrates the preparation of a hermetically sealed pigtail resistor. Using the composition of Example I, two wafers approximately 3/8" in diameter and approximately 1/16" in thickness are prepared by heating a casting of the desired size at about 250° C. for 15 minutes. A hole approximately the size of the pigtail is drilled through the wafers. Each of the pigtails is then drawn through the hole after which two drops of the uncured composition of Example I is placed at the point through which the pigtail passes through the wafer to act as a seal. A tube of a homopolymer of trifluorochloroethylene (N.S.T. about 300) is then slipped over the carbon-resistor and the wafers so as to completely enclose the carbon-resistor. The tubing is then fused to each of the wafers by heating at approximately 250° C. for about 1 minute. This heating also cures the uncured seal. A hermetically sealed carbon-resistor is obtained.

Various alterations and modifications of the invention and its aspects may become apparent to those skilled in the art without departing from the scope of this invention.

Having thus described my invention, I claim:

A novel composition comprising an admixture of a minor proportion of a normally solid polymer of trifluorochloroethylene and a major proportion of the condensation product of epichlorohydrin and bisphenol, said condensation product having a melting point of at least 0° C. and an epoxy equivalent of at least 150 and not exceeding about 3400.

References Cited in the file of this patent

UNITED STATES PATENTS

| | | |
|---|---|---|
| 2,520,919 | Forgie | Sept. 5, 1950 |
| 2,635,162 | Kohring | Apr. 14, 1953 |
| 2,647,192 | Berkelhamer | July 28, 1953 |
| 2,674,678 | Wakefield | Apr. 6, 1954 |
| 2,777,783 | Welch | Jan. 15, 1957 |
| 2,789,960 | Smith | Apr. 23, 1957 |

OTHER REFERENCES

Dunn: Article in the Rubber and Plastic Age, February 1954, pages 84–87.

Versatile Fluorine Plastics, Article in Chemical and Engineering News, volume 30, No. 26, June 30, 1954, pages 2688–2691.